United States Patent Office.

JOHN N. WOODWARD, OF AURORA, ILLINOIS, ASSIGNOR TO HIMSELF AND WALTER SCOTT, OF SAME PLACE.

Letters Patent No. 68,823, dated September 10, 1867.

---

IMPROVEMENT IN STAND FOR SUPPORTING WAGON AND OTHER WHEELS WHEN BEING PAINTED.

---

The Schedule referred to in these Letters Patent and making part of the same.

---

TO ALL WHOM IT MAY CONCERN:

Be it known that I, JOHN N. WOODWARD, of Aurora, in the county of Kane, and State of Illinois, have invented an Improved Stand for Supporting Wagon-Wheels when being Painted; and I do hereby declare that the following is a full, clear, and exact description of the same, reference being had to the annexed drawings, making part of this specification, in which—

The same letters are employed in both figures in the designation of identical parts.

Figure 2:
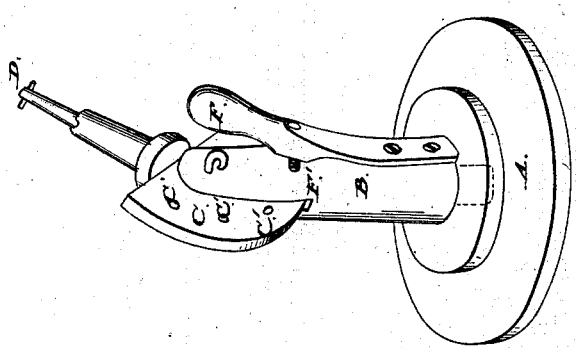
Figure 2 is a similar elevation showing the standard and end of the spindle.
Figure 1:
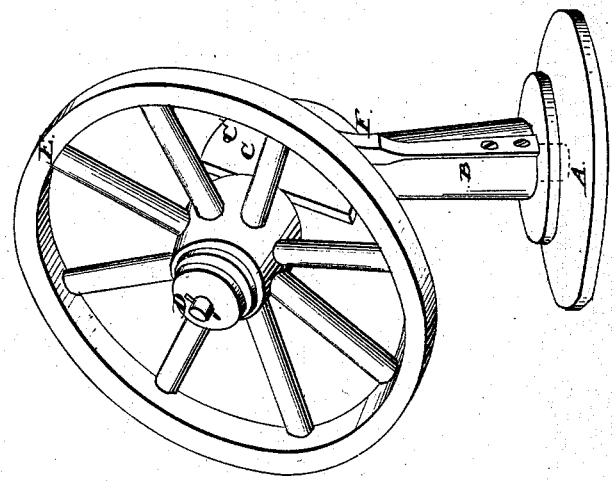
Figure 1 is a side elevation showing the standard and side of the spindle.

A is a metallic bed-plate to be fastened to the floor, and B is a wooden standard projecting from the centre of said plate, in the top of which is cut a vertical slot, B'. The standard is attached to the bed-plate by a pivot, which permits it to turn freely thereon. C is a plate forming an arc of about two hundred and forty degrees of a circle, placed in the slot B', and turning upon a pivot passing through the centre of the circle of which it is an arc. The spindle D projects from the middle of the chord of the arc-formed plate C. This spindle is formed to receive the hub of the wheel E, through which it passes. I prefer to make the spindle of a separate rod attached to the plate C, so that if it is broken another may be inserted. This spindle may be made of one piece fitting the hole through the hub of the wheel, but I prefer to use a rod with a thimble skein, as used in the construction of wagon-axles, adaptable to the size of the wheels. F is a lever and spring, the lower end of which is fastened to the standard B. To this spring-lever is attached a pin, F', which passes through a hole in the standard and through one of a series of holes, C', in the plate C placed in the arc of a smaller circle having the same centre as that of the plate C. The elasticity of the spring-lever F will permit the pin F' to be disengaged from the plate C, which may then be turned on its centre so as to permit the spindle D to be set at any angle between a horizontal and a vertical position, in which position it will be held by the pin F' having passed through a hole C'. The revolving standard allows the wheel to be turned to any position required to afford a proper light.

The object of this stand is to support adjustably a wagon or other wheel to be painted, in any position in which it may be most convenient to the operator to have it placed.

What I claim as my invention, and desire to secure by Letters Patent, is—

The adjustable plate C supporting the spindle D, in combination with the standard B, and a suitable detent F F' for retaining the spindle in any required position, substantially in the manner and for the purpose set forth.

The adjustable plate C supporting the spindle D, in combination with the revolving standard B, plate A, and detent F F' for retaining the spindle and wheel placed thereon in any required position, substantially in the manner and for the purpose set forth.

In testimony whereof I have signed my name to this specification in the presence of two subscribing witnesses.

JOHN N. WOODWARD.

Witnesses:
H. F. VAN NORTHICK,
THOMES ARENSEN.

J. N. WOODWARD.
Carriage-Wheel Jack.

No 68,823.

Patented Sept. 10, 1867.